US010109142B2

(12) United States Patent
Robertson et al.

(10) Patent No.: US 10,109,142 B2
(45) **Date of Patent: *Oct. 23, 2018**

(54) SYSTEM AND METHOD FOR SELECTIVE ENCRYPTION OF INPUT DATA DURING A RETAIL TRANSACTION

(75) Inventors: Philip A. Robertson, Greensboro, NC (US); Rodger K. Williams, Siler City, NC (US); Timothy M. Weston, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,793

(22) Filed: May 27, 2011

(65) Prior Publication Data

US 2011/0231648 A1 Sep. 22, 2011

Related U.S. Application Data

(63) Continuation of application No. 11/197,220, filed on Aug. 4, 2005, now Pat. No. 7,953,968.

(51) Int. Cl.
*G06F 21/00* (2013.01)
*G07F 7/10* (2006.01)

(52) U.S. Cl.
CPC .......... *G07F 7/1008* (2013.01); *G07F 7/1025* (2013.01); *G07F 7/1075* (2013.01)

(58) Field of Classification Search
CPC .... G07F 7/1008; G07F 7/1025; G07F 7/1075; G07F 7/0191; G06F 21/12; G06F 21/30; G06F 21/6218; G06F 21/64; G06F 21/71; G06F 21/83; G06F 3/04886; G06F 21/6245; G06F 21/6281
USPC .......................................................... 713/150
See application file for complete search history.

(56) References Cited

U.S. PATENT DOCUMENTS 4,200,770 A 4/1980 Hellman et al.
4,405,829 A 9/1983 Rivest et al.
(Continued)

OTHER PUBLICATIONS

Examination Report for corresponding European patent application No. 06787794.4 dated Sep. 25, 2012.
(Continued)

*Primary Examiner* — Joseph P Hirl
*Assistant Examiner* — Chi Nguy
(74) *Attorney, Agent, or Firm* — Nelson Mullins Riley & Scarborough, LLP

(57) ABSTRACT

A retail environment having retail terminals with data entry point devices selectively encrypts input received by the data entry point devices and passes the encrypted data to a security module. The selective encryption is based on whether or not sensitive or confidential information, such as a personal identification number (PIN) associated with a debit card, is being input. To prevent hacking of the software of the retail terminal, content destined for display on the retail terminal is authenticated prior to display. In this manner, the retail terminal may be assured that confidential information is input only when desired, and thus may be encrypted only as needed.

6 Claims, 8 Drawing Sheets

(56) References Cited

U.S. PATENT DOCUMENTS

| | | | | |
|---|---|---|---|---|
| 4,797,920 | A | 1/1989 | Stein | |
| 5,228,084 | A | 7/1993 | Johnson et al. | |
| 5,493,613 | A | 2/1996 | Denno et al. | |
| 5,790,410 | A | 8/1998 | Warn et al. | |
| 5,832,206 | A | 11/1998 | De Jesus et al. | |
| 6,026,492 | A | 2/2000 | Cromer et al. | |
| 6,115,819 | A | 9/2000 | Anderson | |
| 6,185,307 | B1 | 2/2001 | Johnson, Jr. | |
| 6,226,749 | B1 * | 5/2001 | Carloganu et al. | 726/2 |
| 6,360,138 | B1 * | 3/2002 | Coppola | G06Q 20/341 700/231 |
| 6,442,448 | B1 * | 8/2002 | Finley | B67D 7/145 700/231 |
| 6,577,734 | B1 | 6/2003 | Etzel et al. | |
| 6,630,928 | B1 * | 10/2003 | McIntyre | G06F 3/04886 345/173 |
| 6,736,313 | B1 | 5/2004 | Dickson | |
| 6,789,733 | B2 | 9/2004 | Terranova et al. | |
| 7,047,223 | B2 | 5/2006 | Watlington | |
| 7,054,829 | B2 | 5/2006 | Campo et al. | |
| 7,215,775 | B2 | 5/2007 | Noguchi et al. | |
| 7,370,200 | B2 | 5/2008 | Kindberg et al. | |
| 2002/0026575 | A1 | 2/2002 | Wheeler et al. | |
| 2002/0066020 | A1 | 5/2002 | Whytock | |
| 2002/0124170 | A1 * | 9/2002 | Johnson, Jr. | G06F 21/6218 713/176 |
| 2002/0138554 | A1 | 9/2002 | Feigen et al. | |
| 2002/0153424 | A1 | 10/2002 | Li | |
| 2002/0157003 | A1 | 10/2002 | Beletski | |
| 2002/0191029 | A1 | 12/2002 | Gillespie et al. | |
| 2003/0002667 | A1 | 1/2003 | Gougeon et al. | |
| 2003/0030720 | A1 | 2/2003 | Hutchings | |
| 2003/0055738 | A1 | 3/2003 | Alie | |
| 2003/0194071 | A1 | 10/2003 | Ramian | |
| 2004/0015958 | A1 * | 1/2004 | Veil et al. | 717/174 |
| 2004/0172339 | A1 | 9/2004 | Snelgrove et al. | |
| 2005/0145690 | A1 | 7/2005 | Shibasaki | |
| 2005/0278533 | A1 | 12/2005 | Mayer | |
| 2006/0089145 | A1 | 4/2006 | Chen et al. | |
| 2006/0179323 | A1 * | 8/2006 | Nei | 713/184 |

OTHER PUBLICATIONS

Examination report from corresponding Australian application No. 2006279151 dated Nov. 15, 2011.

Portions of the prosecution history of European patent application No. 06787794.4, dated Jul. 19, 2006.

Portions of the prosecution history of New Zealand patent application No. 565433, dated Sep. 24, 2009.

PCT International Search Report (dated Mar. 15, 2007) and PCT International Preliminary Report on Patentability (dated Feb. 5, 2008) issued for PCT application No. PCT/US2006/027952 filed on Jul. 19, 2006.

Gilbarco: SMARTConnect, from http://www.gilbarco.com/ind_product.cfm?ContentItemID=185.

"Smart Connect" Product Brochure by Gilbarco Veeder-Root, copyright 2004 Gilbarco Inc.

Portions of the prosecution history of U.S. Appl. No. 11/562,150, filed Nov. 21, 2006.

Chapter 7 of Book 4 of Version 4.1 of the Europay MasterCard Visa ("EMV") standard for Integrated Circuit Card Specifications for Payment Systems (May 2004).

PCT International Search Report and Written Opinion dated May 15, 2008, issued for PCT patent application No. PCT/US2007/023410 filed on Nov. 7, 2007.

"Payment Card Industry ("PCI") PIN Entry Device Testing and Approval Program Guide," Version 4.0, VISA Public, Sep. 2004.

"TFT Color LCD Module: Type: NL6448CC33-30W 26cm (10.4 Type), VGA, Specifications" 4th ed., NEC Corporation, Jul. 13, 2000.

"Payment Card Industry (PCI): POS PIN Entry Device Security Requirements Manual," Version 1.2, Sep. 2004.

"PCI POS PED Evaluation FAQ (Technical)," Sep. 21, 2004.

Australia Patent Office, Second Examination Report dated Jan. 19, 2013 in Australian Patent Application No. 2006279151.

Examination Report issued in corresponding European patent application No. 06787794.4, dated Jun. 4, 2014, all enclosed pages cited.

Office Action dated Aug. 13, 2013 in corresponding Canadian Patent Application 2,617,901, all enclosed pages cited.

Response to Office Action filed Feb. 12, 2014 in corresponding Canadian Patent Application 2,617,901, all enclosed pages cited.

* cited by examiner

SYSTEM AND METHOD FOR SELECTIVE ENCRYPTION OF INPUT DATA DURING A RETAIL TRANSACTION

CROSS-REFERENCE TO RELATED APPLICATIONS

This patent application is a continuation of copending U.S. patent application Ser. No. 11/197,220, filed on Aug. 4, 2005, the entire disclosure of which is hereby incorporated by reference as if set forth verbatim herein and relied upon for all purposes.

FIELD OF THE INVENTION

The present invention is designed to prevent theft of sensitive and/or confidential information, such as personal identification numbers (PINs), during a retail transaction, particularly at a fuel dispenser retail device.

BACKGROUND OF THE INVENTION

Credit card companies such as VISA® and MASTERCARD® have been very successful in persuading customers that credit cards should be used to complete any and all commercial transactions in place of cash. As a result of the success of the credit card, almost every retail establishment now has a magnetic card stripe reader to accept credit cards for payment. Concurrent with the proliferation of the magnetic stripe card readers used to process credit cards, many financial institutions have authorized the issuance of debit cards that are interoperable with the magnetic card readers.

Typically, a credit card is swiped through the magnetic card reader, and the credit card owner does not have to take further steps to complete the authorization of the transaction, although some establishments require a signature to complete the transaction. In contrast, a debit card typically requires the card owner to enter, via a keypad, a personal identification number (PIN) to complete customer authorization of the transaction, since funds are transferred directly from the customer's bank account for payment. The PIN, if present, is typically encrypted at the point of entry and then sent in an encrypted format over open communication links, such as a telephone line, to a host computer for transaction authorization. The encryption is used to protect the PIN from disclosure so that unauthorized persons may not obtain the PIN in clear form to defraud the legitimate card holder, the vendor, or an authorizing institution or card issuer.

Commonly owned U.S. Pat. No. 5,228,084, which is hereby incorporated by reference in its entirety, describes an encryption process for confidential information in the context of a fueling environment. Specifically, fueling environments include a plurality of fuel dispensers that accept debit cards and have a keypad for PIN entry. The '084 patent further describes that the fueling environment is divided into two zones. The first zone is a local zone within the fueling environment. The local zone extends from the data entry point to a security module associated with a site controller. The second zone is the host zone and extends from the security module to the host computer that authorizes the transaction. The PIN is encrypted by the data entry point device (a keypad, a card reader, or the like) using a local encryption algorithm, and is sent to the security module, which is tamper resistant. The security module decrypts the information from the data entry point device using the local encryption scheme and re-encrypts the information according to a host encryption algorithm used by the host computer. After re-encryption, the information is sent to the host computer for transaction authorization. Thus, the PIN is never present in an unencrypted format on the communication links.

While the '084 patent has been particularly efficacious at preventing fraud, the fueling environment has not remained static since its introduction. Specifically, the fuel dispenser has evolved to include a large display that may include a touch screen. Even if the display does not include a touch screen, the fuel dispenser has numerous keypads that are used to interact with the customer. The customer may respond to queries presented on the display by pressing one or more keys on the keypad or the touch screen. Not all of these queries solicit sensitive or confidential information like a PIN. For example, the response to a query about whether a customer wants a receipt is not necessarily confidential. The dual nature of the queries to the customer generates a quandary about what to do with the non-confidential information.

The obvious solution is to encrypt all data received from the customer and pass the encrypted information in the local zone to the security module for decryption so that the security module and the site controller can determine if the data needs re-encryption in the host zone or otherwise needs to be processed. However, this solution imposes a large processing burden on the security module and the site controller. Additionally, the constant communication from the fuel dispenser data entry point device and the security module for all input data, both confidential and non-confidential, burdens the internal communication network of the fueling environment, which in turn may delay the authorization of fueling or raise similar concerns. Thus, there needs to be a better way to encrypt confidential data at the data entry point device.

SUMMARY OF THE INVENTION

The present invention provides two techniques for encrypting data at the data entry point device to prevent fraud in a retail transaction. The first technique involves selectively encrypting only the confidential data at the data entry point device and sending this selectively encrypted data to a security module. In this technique, a system controller associated with the data entry point device knows what queries are posed and what queries generate entry of confidential information. Only the responses to the queries that solicit confidential information are encrypted. The encrypted information is processed normally by the security module. The responses that do not contain confidential information are processed normally by the system controller as needed or desired.

Unfortunately, the first technique has a potential security vulnerability. Specifically, the selective encryption of certain responses and the lack of encryption on other responses create windows of opportunity during which a thief could attempt to steal confidential information. A thief could hack or reprogram the software controlling the data entry point device and the display such that the display prompts the user to enter confidential information at a time during which the normal software does not expect entry of confidential information. The modified software could then record the key strokes of the customer and capture confidential information such as a personal identification number (PIN). As a result of this vulnerability, the selective encryption approach alone is not preferred, although it forms part of the present invention.

The second technique also involves the selective encryption of confidential information, as discussed above, but adds a layer of complexity to the software to enhance the security vulnerability of the first technique. Specifically, the second technique, before any content is presented on the display, causes the system controller to verify the content. Once the content has been verified, the content is displayed. In this manner, no fraudulent content is presented on the display and there is no opportunity for a hacker to control the display in an unauthorized manner to request that the user enter confidential information at a time during which the data will not be encrypted. Since the selective encryption of data is used, the security module and the internal network for the retail establishment are not overburdened. Alternatively, if the content is not authenticated, the content may still be displayed, but the data entry point devices may be disabled such that no input from the customer is accepted.

The content is verified through an authentication process in which indicia associated with the content is compared to a secure copy of the indicia. If the indicia match, then the content is verified. In an exemplary embodiment, the indicia comprise a digital signature and the secure copy of the indicia is passed to the retail establishment through an encrypted communication. Other forms of verification are also possible.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is directed to providing selective encryption of data at a retail terminal. In a particularly contemplated embodiment, the retail terminal is a fuel dispenser in a fueling environment. Sensitive or confidential information, such as a credit card account number or personal identification number (PIN), is solicited from a customer at predetermined times during the course of a transaction. The customer then enters the confidential information through a data entry point device such as a keypad. The fuel dispenser's controller knows that the data entry point device is receiving confidential information, and the controller causes the confidential information to be encrypted and passed to a security module. When non-confidential information is being entered by the customer, the fuel dispenser's controller knows that the data entry point device is receiving non-confidential information, and causes the input to be processed normally without encryption.

In an improved embodiment, the content of the display associated with the retail terminal is verified so that fraudulent content that solicits confidential information when the controller is expecting non-confidential data cannot be displayed. Verification of the content of the display helps insure that someone has not reprogrammed the content in an unauthorized manner. Since the content of the display is known and verified, the fuel dispenser's control system knows when confidential information is being solicited, and thus knows when to encrypt information received at the data entry point devices. Likewise, the fuel dispenser's control system knows when the information being received at the data entry point devices is not confidential and thus does not need to be encrypted. While the present invention is optimized for use on a fuel dispenser in a fueling environment, the invention is not so limited and may be used with other retail terminals or kiosks in other retail settings.

Figure 1:
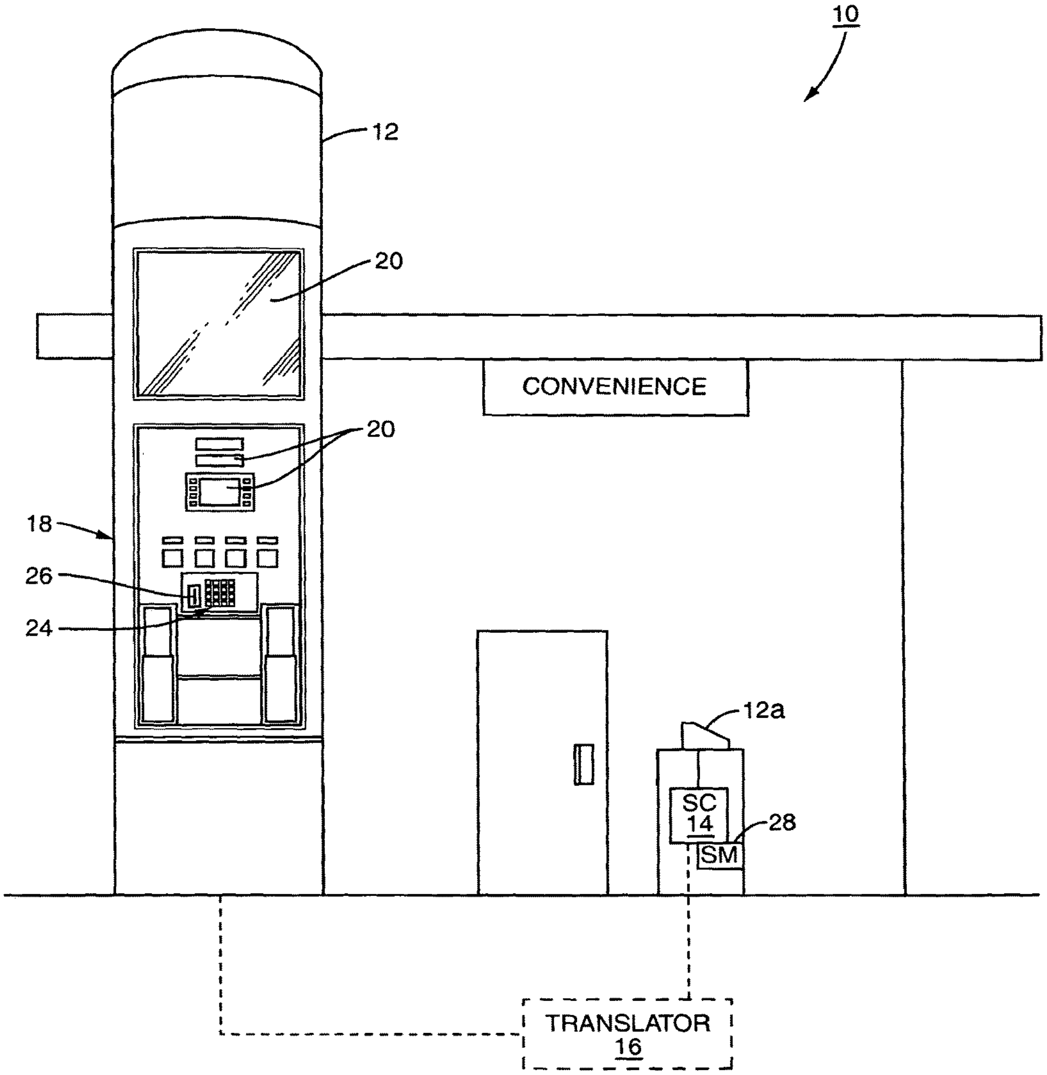
FIG. 1 PRIOR ART
FIG. 1 illustrates a fuel dispenser in a fueling environment.
Figure 4:
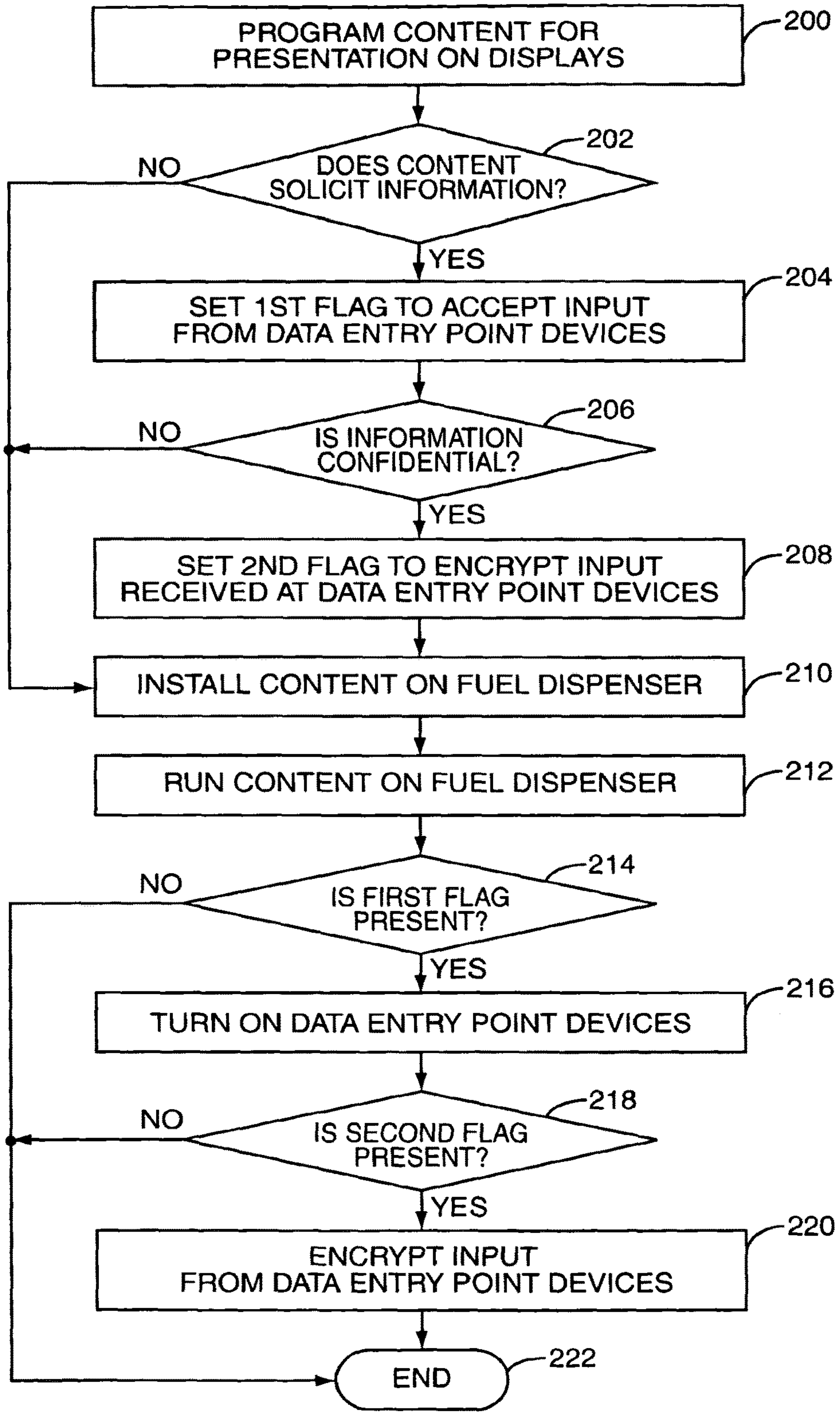
FIG. 4 illustrates in a flow chart the steps of a first exemplary methodology of the present invention.

Because the present invention is optimized for use in a fueling environment, the present disclosure starts with an overview of a fueling environment 10 in FIG. 1 and its supporting hardware and software. The methodology of the present invention is illustrated in FIGS. 4-5B below, but the fueling environment 10 is explained initially so that the reader has a thorough understanding of the context of the present invention.

The fueling environment 10 includes one or more fuel dispensers 12 (only one illustrated) in a forecourt of the fueling environment. The fuel dispensers 12 communicate with a site controller (SC) 14 in a central building of the fueling environment. Note that the central building is not necessarily central to the physical layout of the fueling environment 10, but typically serves as the central focus of the fueling environment 10 and may include a convenience store, a quick serve restaurant, a service bay, or the like as is well understood. The site controller 14 may be associated with a counter top retail terminal 12*a* if needed or desired.

The connection between the fuel dispensers 12 and the site controller 14 may be facilitated through an optional translator 16. In an exemplary embodiment, the fuel dispensers 12 may be the ENCORE® or ECLIPSE® fuel dispensers sold by the assignee of the present invention, Gilbarco Inc., of 7300 W. Friendly Avenue, Greensboro, N.C. 22087. Other fuel dispensers could also be used if needed or desired. The site controller 14 may be the G-SITE® also sold by the assignee of the present invention, Gilbarco Inc. Other site controllers could also be used if needed or desired. Sometimes the site controller 14 may not be made by the same manufacturer as the fuel dispensers 12, in which case certain proprietary protocols may not be fully compatible. The optional translator 16 may be used to make the elements compatible, as is well known.

Figure 2:
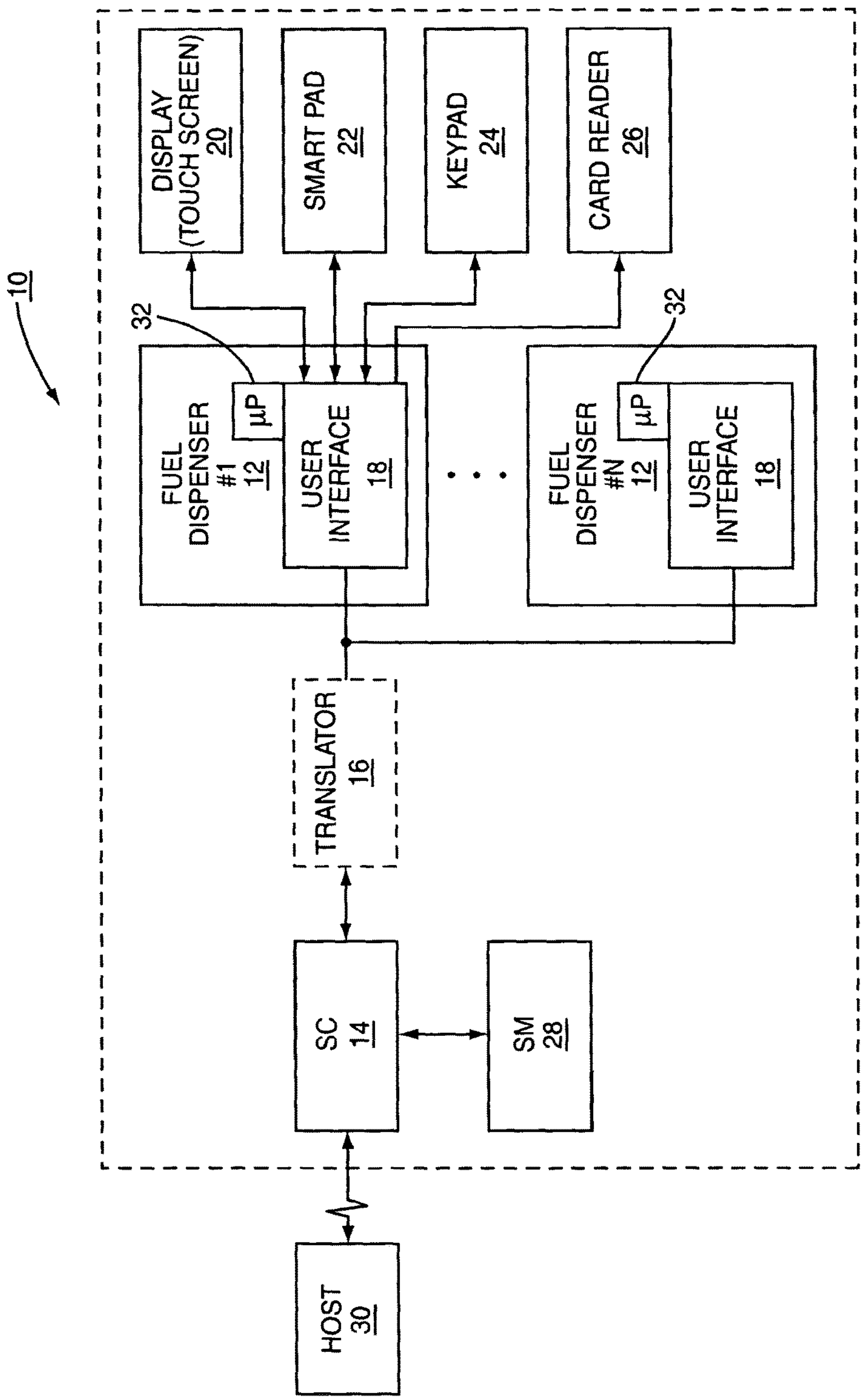
FIG. 2 PRIOR ART
FIG. 2 illustrates schematically the elements of the fuel dispenser and the fueling environment connected to a host computer.

Each fuel dispenser 12 may have a user interface 18 (illustrated schematically in FIG. 2). Each user interface 18 may include one or more displays 20, which may optionally be a touch screen display, a smart pad 22 (FIG. 2 only), a keypad 24 and a card reader 26. The smart pad 22 may be the Smart Pad™ sold by Gilbarco Inc. For more information about the Smart Pad™, the interested reader is referred to commonly owned U.S. Pat. No. 6,736,313, which is hereby incorporated by reference in its entirety. In use, the customer may swipe her debit card (or other payment mechanism) in the card reader 26 and enter her PIN through either the smart pad 22 or the keypad 24. Collectively, the display 20 (if equipped with a touch pad), smart pad 22, the keypad 24, and the card reader 26 are referred to as data entry point devices. The term "data entry point devices" is also herein defined to include contactless card readers and interrogators that interoperate with smart cards, transponders, and other contactless or wireless payment mechanisms that allow the transfer of information from an item controlled by a customer to the fuel dispenser 12 or other retail terminal.

The user interface 18 and/or the data entry point devices (20, 22, 24) encrypts the card number and the PIN according to a local encryption scheme and sends the encrypted information to a security module (SM) 28 through the site controller 14. The previously incorporated '084 and '313 patents both discuss how the card number and PIN are encrypted, and the interested reader is referred to those disclosures for a better comprehension of this process. Encryption of the information reduces concerns about sending the information over communication media on which the information may be intercepted.

The encrypted information is decrypted by the security module 28 using the local encryption scheme and re-encrypted using a host encryption scheme. The security module 28 then sends the re-encrypted information to a host computer 30. The transmission to the host computer 30 may be over a telephone line, a packet network, or the like as needed or desired. Even if the re-encrypted information is intercepted, the host encryption scheme reduces the likelihood of a malefactor gaining access to the card number or PIN. In an exemplary embodiment, the host computer 30 may be a front end merchant processor such as BUYPASS™, PAYMENTECH™, VITAL™, HEARTLAND EXCHANGE™, or the like. Front end merchant processors act as an interface to companies such as SUN TRUST™, BANK OF AMERICA™, WELLS FARGO™, CONCORD EFS™, and the like. Such arrangements are well known in the industry.

In practice, the fueling environment 10 purchases a security module 28 from a manufacturer such as Gilbarco Inc., and has the manufacturer's authorized representatives install the security module 28 at the fueling environment 10. Once the security module 28 is installed, cryptographic keys may be exchanged between the data entry point devices (20, 22, 24) and the security module 28 for local and host zone encryption.

Figure 3:
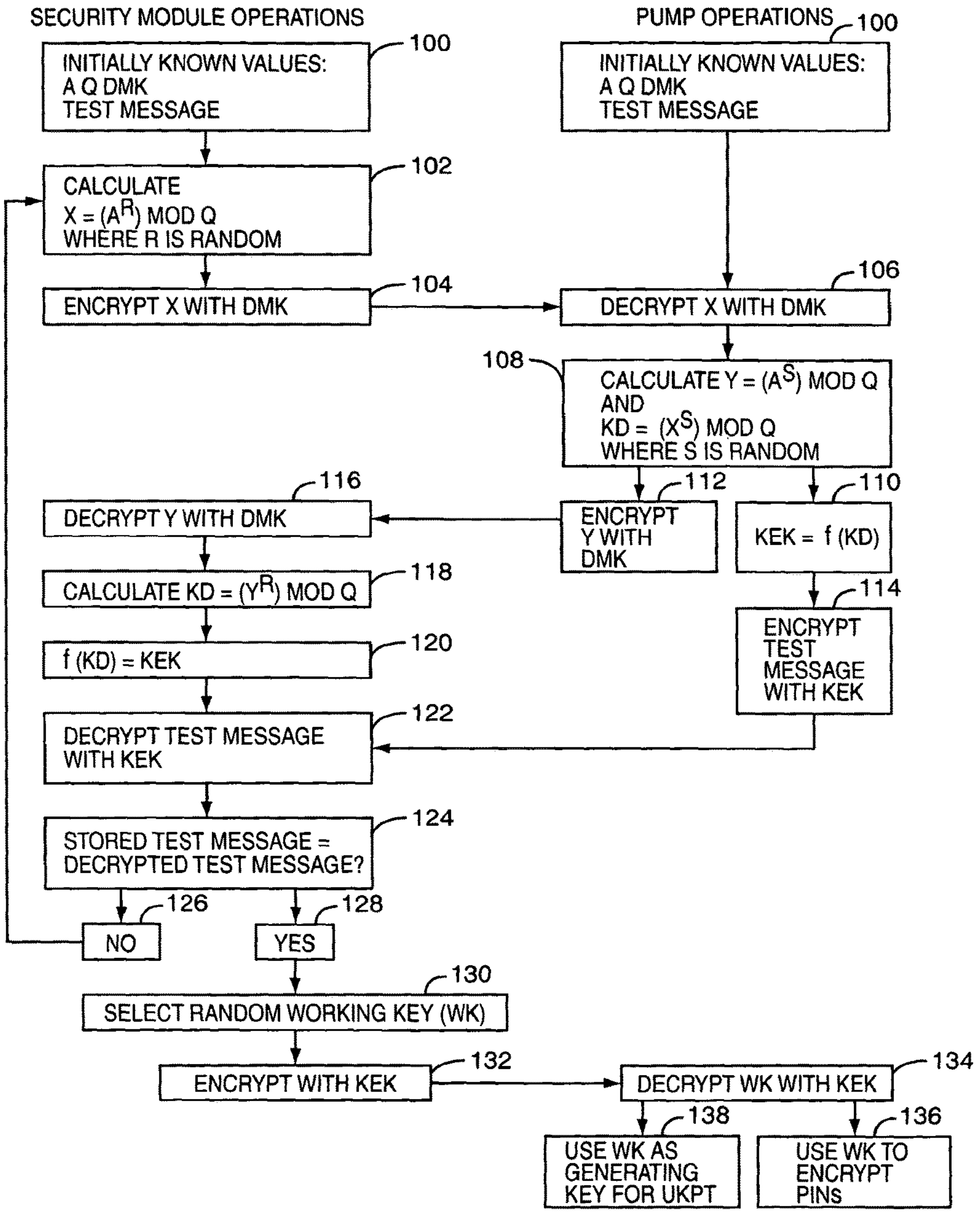
FIG. 3 PRIOR ART
FIG. 3 illustrates in a flow chart the steps of passing the encryption keys to the fuel dispenser for transactional use.

In an exemplary embodiment, the site controller 14 is in overall charge of the operation of the fueling environment 10, including the sequence of events between the security module 28 and the fuel dispensers 12. The site controller 14, which is in communication with the fuel dispensers 12, determines that one or more of the fuel dispensers 12 requires a cryptographic key. To initiate the process, the site controller 14 requests key generation for a specific fuel dispenser 12 from the security module 28. The following process is known as exponential key exchange, and is presented in a flow chart format in FIG. 3 as an example. The security module 28 and the fuel dispenser 12 (or other remote unit as needed or desired) are both initially loaded with several values in common, namely the values A, Q, a test message, and a default master key (DMK) (blocks 100). The values A and Q are large prime numbers. None of these values need to be stored on a secure basis, since even knowledge of all four will not assist a malefactor in determining the actual encryption keys which will be used to encrypt the PINs.

The security module 28 selects a large random number R and calculates the value X=Mod Q($A^R$) (block 102), where the Mod function returns the integer remainder after long division. That is, X=the remainder when A to the R power is divided by Q. The value of X is then encrypted by the security module 28 using the default master key (block 104). The encrypted value of X is then sent to the site controller 14 and the site controller 14 sends it to the correct fuel dispenser 12. The fuel dispenser 12 decrypts X with the default master key (block 106). Then the fuel dispenser 12 selects a random number S and calculates Y=($A^S$)Mod Q and KD=($X^S$)Mod Q (block 108).

The fuel dispenser 12 then calculates a Key Exchange Key (KEK) from the value KD (block 110). This calculation may involve any desired suitable function f(KD) so as to produce KEK as a 64 bit DES key. Several methods can be used in f(KD), including truncation and exclusive ORing parts of KD together.

The fuel dispenser 12 then encrypts Y with the default key (block 112), and encrypts the test message using the DES algorithm with KEK used as the encryption key (block 114). Both the encrypted Y and the encrypted test message are returned to the site controller 14, which in turn sends this data to the security module 28.

The security module 28 decrypts Y with the default key (block 116) and then calculates KD=($Y^R$)Mod Q (block 118). The security module 28 then calculates KEK from the value KD, using the same function f(KD) previously used by the fuel dispenser 12 (block 120). Using the value KEK, the security module 28 then decrypts the test message which was encrypted by the fuel dispenser 12 with the KEK (block 122).

The security module 28 compares the stored test message to the decrypted test message (block 124). If the test message does not match the stored value (block 126), the security module 28 selects a new random number R, and calculates a new X=($A^R$)Mod Q to start the process over again (block 102). If the decrypted test message matches the test message stored within the security module 28 (block 128), then the security module 28 continues with the setup process, because the fuel dispenser 12 and the security module 28 have calculated the same KEK. The KEK values in the fuel dispenser 12 and the security module 28 are equal, not only as confirmed by identity in the test messages, but also because the values of KEK calculated are mathematically equivalent.

The security module 28 then selects a randomly or pseudorandomly generated working key, WK (block 130), encrypts it with the KEK (block 132), and sends it to the site controller 14, which then sends it to the correct fuel dispenser 12. The fuel dispenser 12 decrypts the working key with the KEK (block 134). Depending on the desired mode of operation, the dispenser may use WK as an encrypting key in any of the various encryption methods whenever a PIN or card number is to be encrypted (block 136).

In a particularly contemplated embodiment, the fuel dispensers 12 use WK as a generating key for Unique Key Per Transaction (UKPT) (block 138). As long as the fuel dispenser 12 and the security module 28 retain the KEK, it is not changed, but the working keys between the security module 28 and the fuel dispensers 12 are preferably changed regularly in response to specific system events or on a timed basis. The KEKs may change for various reasons: cold starting a fuel dispenser 12 (clearing all its memory data storage); replacing a fuel dispenser 12 or a security module 28; or replacing a site controller 14 (either hardware or software). The generation of the KEKs may also be accomplished by algorithms other than exponential key exchange if needed or desired.

As noted above, not every input received by the data entry point devices (20, 22, 24) contains confidential information. As further noted above, if every input received by the data entry point devices (20, 22, 24) is encrypted and sent to the security module 28, such activity unnecessarily taxes the security module 28, and may clutter the internal communication network of the fueling environment 10. The present invention solves this problem by providing software embodied on a computer readable medium (such as FLASH memory, EEPROM, a hard drive, or the like) that knows when confidential and non-confidential information is being solicited at the data entry point devices (20, 22, 24) and selectively encrypts only the confidential information. While software is preferred, it is possible that the present invention could also be implemented in hardware, such as an Application Specific Integrated Circuit (ASIC), that effectuates the same result. A flowchart of a first exemplary embodiment of the present invention is presented in FIG. 4.

Initially, the content for presentation on the displays 20 is programmed (block 200). Programming of the content may be done through any conventional manner such as in a conventional programming language as C, C++, JAVA, or the like. Content can be divided into two sorts of content: the first type does not solicit information from the customer and the second type does solicit information from the customer. A determination is made as to whether the content solicits information (block 202). If the answer to block 202 is yes, then a first flag is set for the content to accept input from the data entry point devices (20, 22, 24) (block 204). If the answer to block 202 is no, the content does not solicit information, the process proceeds to block 210, explained below.

A second determination is made as to whether the information that is solicited is confidential (block 206). If the answer to block 206 is no, the information is not confidential, the process proceeds to block 210, explained below. If the answer to block 206 is yes, then a second flag is set for the fuel dispenser 12 to encrypt input received at the data entry point devices (20, 22, 24) (block 208).

The content is then installed on the fuel dispenser 12 (block 210). The content may be installed on the fuel dispenser 12 in any conventional manner such as through downloading from a remote source; uploading from a computer readable medium such as a floppy disk, compact disc, or optical disc; insertion of a memory device such as an EEPROM; programming the fuel dispenser 12 directly; or any other technique that allows the fuel dispenser 12 to have access to the content. After installation, the content runs on the fuel dispenser 12 (block 212). The content may provide advertising to the customers, instruct the customers on how to use the fuel dispenser 12, or provide responses to customer input, as is well understood. As the content is run on the fuel dispenser 12, the fuel dispenser control system (NP) 32 (see FIG. 2) checks to see if the first flag is present (block 214). If the answer to block 214 is yes, then the fuel dispenser control system 32 turns on the data entry point devices (20, 22, 24) such that they will accept input from the customer (block 216). The fuel dispenser control system 32 then checks to see if the second flag is present (block 218). If the answer to block 218 is yes, the second flag is present, the fuel dispenser control system 32 instructs the data entry point devices (20, 22, 24) to encrypt input received by the data entry point devices (20, 22, 24) (block 220). If the answer to either block 214 or 218 is no, or after block 220, then the process ends (block 222).

While it is illustrated that the process ends at block 222, the more probable practical implementation is that the process will repeat as additional content is presented on the display 20 and the fuel dispenser control system 32 checks for the presence of the flags. Further, while the process described above presents the decision making as being within the fuel dispenser control system 32, it is possible that the decision making could be within the data entry point devices (20, 22, 24) or other processor that operates the data entry point devices (20, 22, 24). Still further, while the process describes a particular sequence of checking for flags and may potentially imply that there is an order in which the flags are checked, it should be appreciated that the flags can be checked concurrently or in reverse order. Even further, while the use of flags is a particularly contemplated way to implement the present invention, other programming techniques could be used to effectuate the same functionality without departing from the scope of the present invention.

While the embodiment presented in FIG. 4 is helpful to reduce demands on the security module 28 and the internal communication network of the fueling environment 10 by only encrypting confidential solicited data, the embodiment of FIG. 4 is potentially vulnerable. In particular, the fuel dispenser control system 32 could be programmed to display unauthorized content on the display 20 that requests confidential information when such is not expected, or the content could be reprogrammed to remove the second flag or new content could be provided which does not have the second flag. The present invention's second and preferred embodiment addresses this vulnerability, and is presented with reference to FIGS. 5A and 5B.

The second embodiment builds on the first embodiment and relies on the concept of authenticating the content before it is displayed on the retail device. If the content is not authenticated, then the data entry point devices (20, 22, 24) may remain inoperative or the fuel dispenser control system 32 may preclude the content from being presented on the display 20. The process of authentication is described in detail below with references to FIGS. 6 and 7, and in commonly owned U.S. patent application Ser. No. 09/798,411, filed Mar. 2, 2001, which is hereby incorporated by reference in its entirety and is now published as U.S. Patent Publication No. 2002/0124170. While the '411 application is a particularly contemplated method of performing an authentication process, any form or method of content authentication is within the scope of the present invention.

Figure 5A:
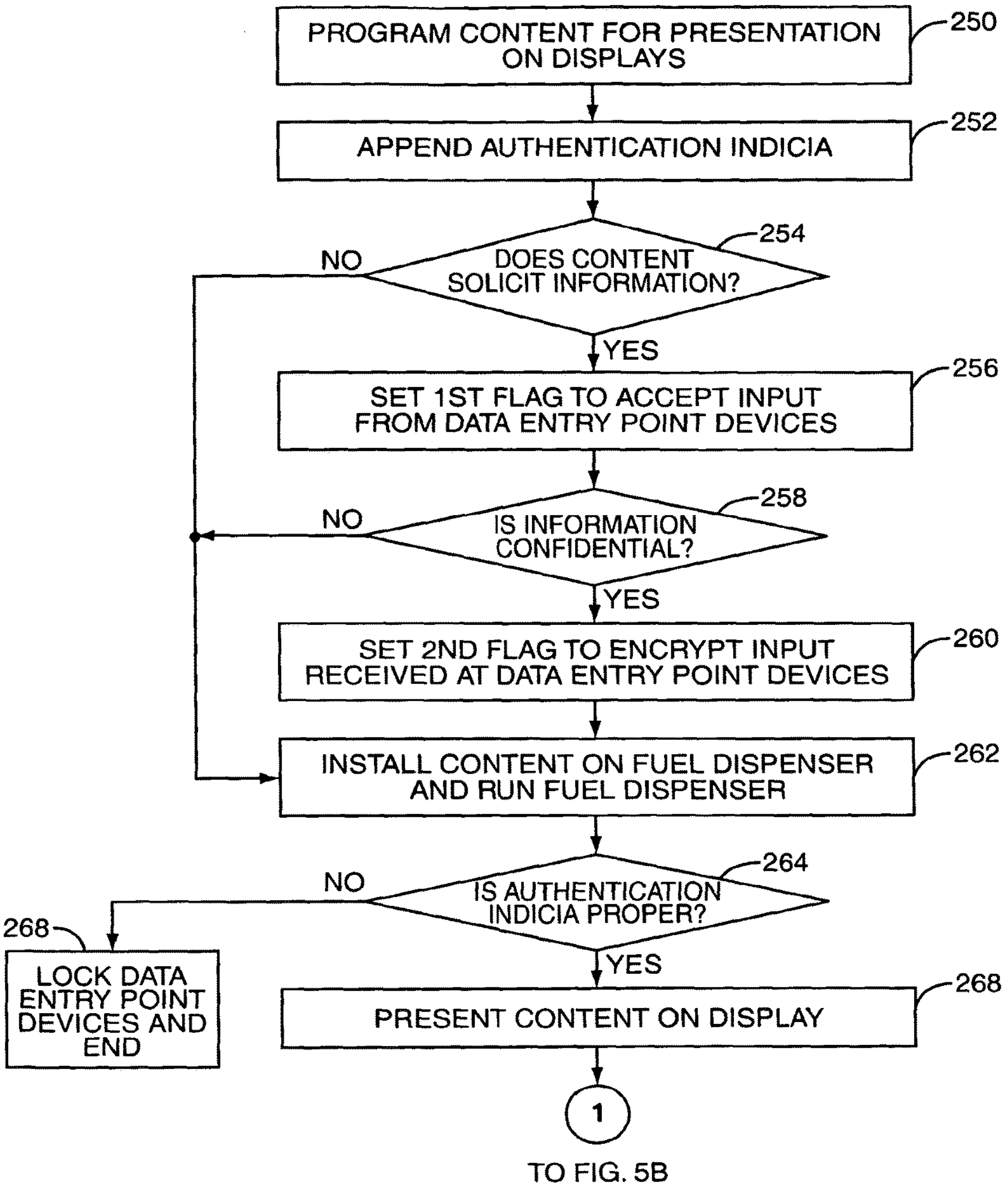
FIGS. 5A and 5B illustrate in a flow chart the steps of a second exemplary methodology of the present invention.
Figure 5B:
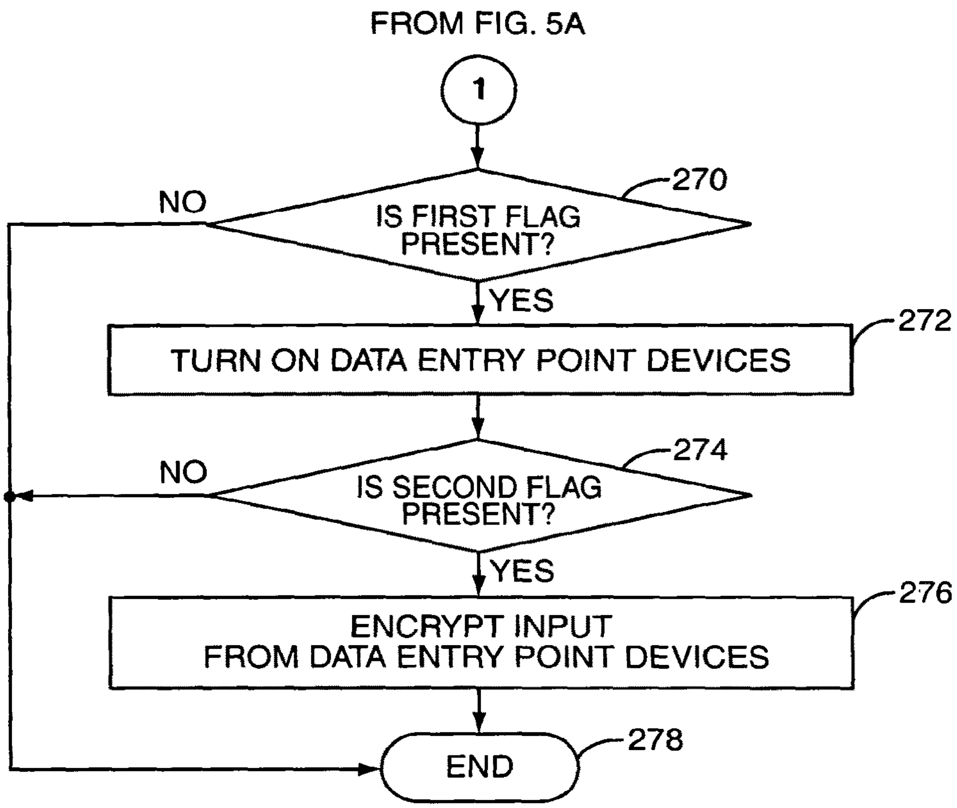

The second embodiment begins much as the first embodiment, wherein content is programmed for presentation on the displays 20 of the fuel dispensers 12 (block 250, FIG. 5A). After the content is programmed, appropriate authentication indicia are appended to the content (block 252). A determination is made as to whether the content solicits information (block 254). If the answer to block 254 is yes, then a first flag is set for the content to accept input from the data entry point devices (block 256). If the answer to block 254 is no, the content does not solicit information, the process proceeds to block 262, explained below.

A second determination is made as to whether the information that is solicited is confidential (block 258). If the answer to block 258 is no, the information is not confidential, the process proceeds to block 262, explained below. If the answer to block 258 is yes, then a second flag is set for the fuel dispenser 12 to encrypt input received at the data entry point devices (block 260).

The content is then installed on the fuel dispenser 12 and the fuel dispenser 12 runs (block 262). The content may be installed on the fuel dispenser 12 in any conventional manner. After installation, the fuel dispenser control system 32 of the fuel dispenser 12 determines if the authentication indicia on the content is proper (block 264). As noted above, the process by which content is authenticated is explained in greater detail below. If the answer to block 264 is no, the authentication indicia is missing or otherwise improper, the fuel dispenser 12 may lock or otherwise disable the data entry point devices such that no input therefrom is accepted and end the process (block 266). The fuel dispenser comprises fuel delivery components wherein the control system is adapted to control delivery of fuel to the user through the fuel delivery components. Additionally (or alternatively), the fuel dispenser 12 may preclude the content from being presented on display or take other steps (such as generating an alarm) to prevent the customer from inputting data in response to the unauthenticated content.

If the answer to block 264 is yes, the authentication indicia is proper, then the fuel dispenser 12 presents the content on the display 20 (block 268). The content may provide advertising to the customers, instruct the customers on how to use the fuel dispenser 12, or provide responses to customer input as is well understood. As the content is run on the fuel dispenser 12, the fuel dispenser control system 32 checks to see if the first flag is present (block 270, FIG. 5B). If the answer to block 270 is yes, then the fuel dispenser control system 32 turns on the data entry point devices such that they will accept input from the customer (block 272). The fuel dispenser control system 32 then checks to see if the second flag is present (block 274). If the answer to block 274 is yes, the second flag is present, the fuel dispenser control system 32 instructs the data entry point devices (20, 22, 24) to encrypt input received by the data entry point devices (20, 22, 24) (block 276). If the answer to either block 270 or 274 is no, or after block 276, then the process ends (block 278).

As noted above, while it is illustrated that the process ends at block 278, the more probable practical implementation is that the process will repeat as additional content is presented on the display 20 and the fuel dispenser control system 32 checks for the presence of the flags. Further, while the process described above presents the decision making as being within the fuel dispenser control system 32, it is possible that the decision making could be within the data entry point devices (20, 22, 24) or other processor that operates the data entry point devices (20, 22, 24). Still further, while the process describes a particular sequence of checking for flags and may potentially imply that there is an order in which the flags are checked, it should be appreciated that the flags can be checked concurrently or in reverse order. Even further, while the use of flags is a particularly contemplated way to implement the present invention, other programming techniques could be used to effectuate the same functionality without departing from the scope of the present invention.

The process of authenticating content is explored in the previously incorporated '411 application. Portions of that disclosure are set forth herein for convenience. In essence, a digital signature is appended to the file for authentication. In its basic definition, a digital signature says "I wrote this page and I signed it", where "I" represents the person or entity that is able to create the digital signature. A digital signature is most usually appended to the end of the data being signed, but it could be embedded within the data in some circumstances. The digital signature scheme may use public and private keys akin to those described above. Where such a scheme is used, the "I" is the person or entity that owns the private key. With the private key, the key owner is able to create the digital signatures. The owner of the private key keeps the private key secret.

The public key can either be published or stored in a non-secure manner since it does not have to be kept secret. The public key is used to verify that the digital signature is authentic. The public key cannot be used to generate a valid digital signature. An example of a digital signature system that uses private and public keys is the one defined in Federal Information Processing Standard (FIPS) publications 180 and 186. This version of a digital signature is referred to as the Digital Signature Standard (DSS).

Figure 6:
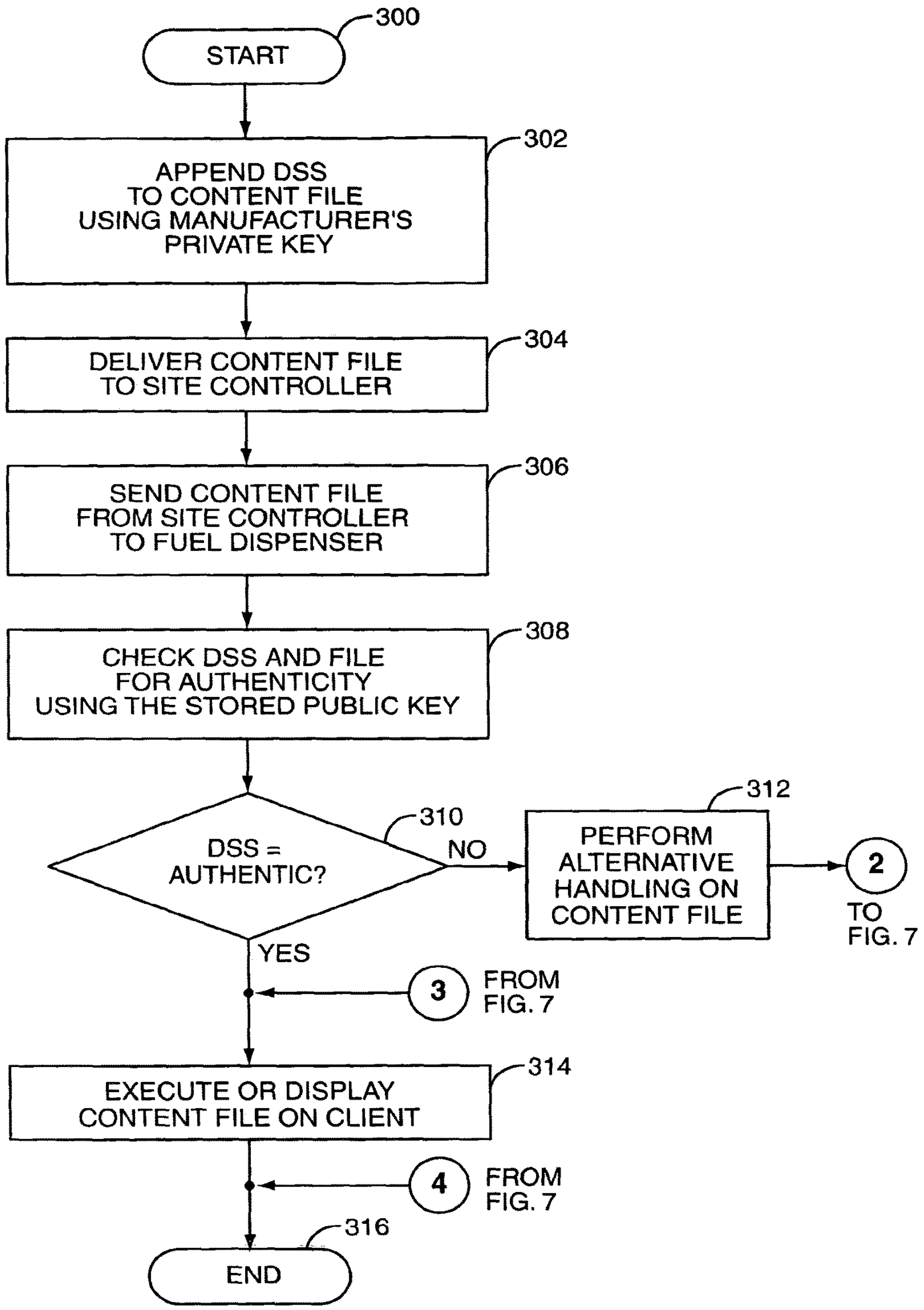
FIGS. 6 and 7 illustrate in a flow chart the steps of authenticating content provided by a manufacturer.

FIG. 6 illustrates a situation wherein the digital signature of the content is provided by the Original Equipment Manufacturer (OEM). That is, the content is created by the manufacturer of the fuel dispenser 12. This content file is transferred to the fuel dispenser 12 after operating software has been downloaded and is operational in the fuel dispenser 12.

The process starts (block 300), and the OEM appends its signature, also known as DSS, to the content file, using the OEM's private key (block 302). The content file is delivered to the site controller 14 either by electronic communication or by a downloading device directly connected to site controller 14 (block 304). The content file is sent from site controller 14 to the fuel dispenser 12 when desired (block 308). The content file may be a particular web page application that is only to be presented on fuel dispenser 12 for a particular option selected by the customer. The application software or boot software, depending on the configuration of the system, uses the public key to authenticate the signature with the file contents (block 308), and the fuel dispenser 12 decides if the signature is authentic (decision 310). If the signature is not authentic, the fuel dispenser 12 performs alternative handling on the content file (block 312). If the content file is authenticated, the content file is executed by fuel dispenser control system 32 of the fuel dispenser 12 (block 314), and the process ends (block 316).

Figure 7:
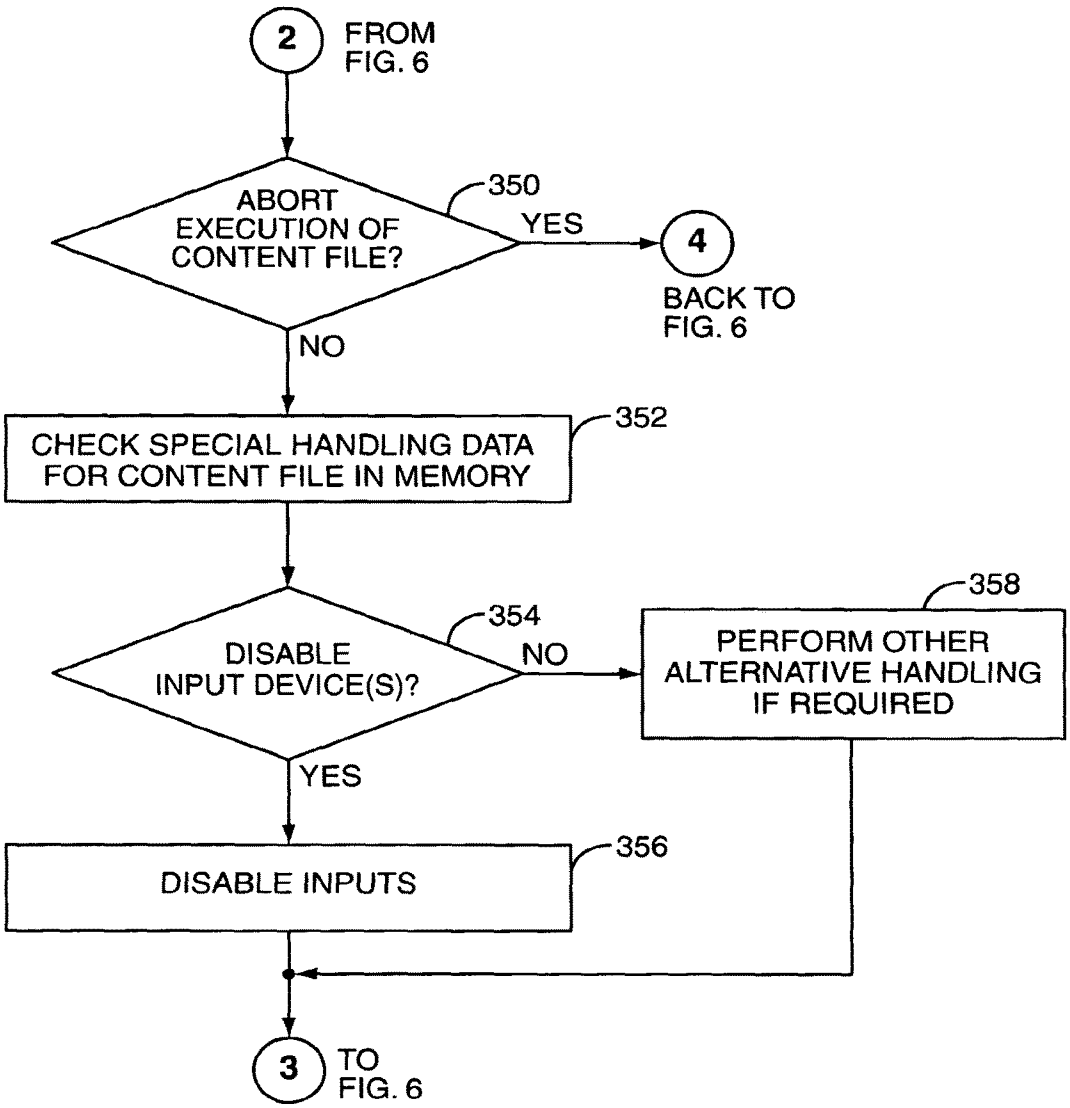

If the content file was not authenticated (decision 310), alternative handling is performed on the content file (block 312) as illustrated in the flowchart in FIG. 6. The alternative handling process is illustrated in FIG. 7. The fuel dispenser control system 32 first determines if execution of the content file should be aborted by determining the configuration information concerning alternative handling of content files stored in memory of the fuel dispenser 12 (decision 350). If the content file execution is to be aborted, the process ends (block 316 from FIG. 6). If the content file is to be executed, but in a special manner, the special handling data for non-authenticated content files is checked in memory of the fuel dispenser 12 (block 352). If the special handling data requires that data entry input devices at the fuel dispenser 12 be disabled (decision 354), the fuel dispenser control system 32 causes the data entry input devices to be disabled (block 356), and the content file is executed if desired (block 314 from FIG. 6). In this manner, the content file is still executed on the fuel dispenser 12 but the customer cannot interact with the data entry input devices since they are disabled. If the data entry input devices are not to be disabled, any other alternative handling is performed as dictated by the special handling data in memory of the fuel dispenser 12 (block 358), and the content file is executed (block 314 from FIG. 6) if desired.

If the content is derived from a third party other than the OEM, the previously incorporated '411 application describes how to authenticate such content as well. The '411 application also describes how content may be delivered to the fuel dispenser 12 in a secure manner. The interested reader is referred to the '411 application for a more thorough understanding of authentication and content delivery. Other techniques for authenticating data are also within the scope of the present invention.

Those skilled in the art will recognize improvements and modifications to the preferred embodiments of the present invention. All such improvements and modifications are considered within the scope of the concepts disclosed herein and the claims that follow.

What is claimed is:

1. A method of collecting information at a retail terminal having a display and at least one input device, the method comprising:

executing an application on the retail terminal, wherein the application comprises content to be presented on the display, wherein the content comprises at least one of advertising, instructions, and requests for confidential information from a user;

evaluating the application during execution thereof to determine whether the content contains one or more requests for confidential information;

authenticating the content to be presented on the display, regardless of whether the content contains one or more requests for confidential information;

presenting the content on the display if the content is authenticated;

if the content contains one or more requests for confidential information, encrypting data received from the at least one input device for transmission to a location separate from the retail terminal; and transmitting the data received from the at least one input device as unencrypted if the information requested is not confidential information.

2. The method of claim 1, wherein determining whether content contains one or more requests for confidential information comprises determining whether the content requests a personal identification number (PIN).

3. The method of claim 1, wherein collecting information at the retail terminal comprises collecting information at a fuel dispenser.

4. The method of claim 1, wherein authenticating the content comprises checking a digital signature.

5. The method of claim 1, further comprising enabling the at least one input device when the content is authenticated.

6. The method of claim 1, further comprising receiving the non-confidential information at the at least one input device.

* * * * *